(12) United States Patent
Zhang et al.

(10) Patent No.: US 11,863,238 B2
(45) Date of Patent: Jan. 2, 2024

(54) DUAL-MODE RECEIVER INTEGRATED WITH DISPERSION COMPENSATOR

(71) Applicant: Alpine Optoelectronics, Inc., Fremont, CA (US)

(72) Inventors: Xingyu Zhang, Fremont, CA (US); Tongqing Wang, Fremont, CA (US)

( * ) Notice: Subject to any disclaimer, the term of this patent is extended or adjusted under 35 U.S.C. 154(b) by 0 days.

(21) Appl. No.: 17/456,137

(22) Filed: Nov. 22, 2021

(65) Prior Publication Data

US 2023/0163858 A1 May 25, 2023

(51) Int. Cl.
| H04B 10/69 | (2013.01) |
| G02B 6/12 | (2006.01) |
| H04B 10/079 | (2013.01) |
| G02B 6/293 | (2006.01) |

(52) U.S. Cl.
CPC ....... H04B 10/693 (2013.01); G02B 6/12004 (2013.01); G02B 6/12007 (2013.01); H04B 10/07953 (2013.01); G02B 6/29355 (2013.01)

(58) Field of Classification Search
CPC ............ H04B 10/693; H04B 10/07953; G02B 6/12004; G02B 6/12007
USPC .......................................................... 398/27
See application file for complete search history.

(56) References Cited

U.S. PATENT DOCUMENTS

| 6,961,492 B2* | 11/2005 | Doerr ................. G02B 6/29355 385/27 |
| 7,813,647 B2* | 10/2010 | Ohtani ............. H04B 10/25133 398/147 |
| 8,447,190 B2* | 5/2013 | Tanimura ........... H04B 10/6161 398/147 |
| 8,611,764 B2* | 12/2013 | Ota .................. H04B 10/25133 398/208 |
| 10,944,482 B2* | 3/2021 | Younce ................ H04B 10/614 |
| 11,228,367 B2* | 1/2022 | Tanimura ............... H04B 10/61 |
| 2011/0217040 A1* | 9/2011 | Mori ....................... H04J 14/08 398/53 |
| 2019/0391348 A1* | 12/2019 | Osenbach ............ G02B 6/4246 |
| 2020/0052796 A1* | 2/2020 | Kim ........................ H03F 3/082 |

OTHER PUBLICATIONS

Cho et al; Long-range, phase-and-polarization diversity coherent reflectometer; 2018; Optical Society of America; pp. 1-12. (Year: 2018).*
Che et al; Direct detection of the optical field beyond single polarization mode; Feb. 2018; Optics Express; pp. 1-13. (Year: 2018).*

* cited by examiner

*Primary Examiner* — Amritbir K Sandhu
(74) *Attorney, Agent, or Firm* — CIONCA IP Law P.C.; Marin Cionca (57) ABSTRACT

An integrated receiver chip comprising: a first end and a second end; at least one optical input port disposed at the first end; a polarization manipulation device optically connected to one of the at least one optical input port, the polarization manipulation device being adapted to split an optical signal into a first and a second optical signals; a first and a second dispersion compensators each optically connected to the polarization manipulation device, the first and the second dispersion compensators each being adapted to selectively induce a dispersion on an optical signal propagating through the dispersion compensator; and a first and a second photodetectors optically connected to the first and the second dispersion compensators, respectively.

20 Claims, 4 Drawing Sheets

DUAL-MODE RECEIVER INTEGRATED WITH DISPERSION COMPENSATOR

BACKGROUND OF INVENTION

1. Field of the Invention

The invention relates generally to integrated photonics receivers, and more specifically to dual-mode integrated photonics receivers based on paired photodetectors and having tunable dispersion compensator devices.

2. Description of the Related Art

In the field of integrated photonics, optical receivers may be employed in various optical systems for optical-to-electrical (OE) conversion of optical light. A polarization insensitive integrated photonics receiver, as an example, may be realized using a 1×2 polarization splitter rotator optically connected to a dual-input photodetector (PD) (P-I-N-based PD, for example), where the input ports of the photodetector are located at opposite sides of the photodetector, for example. The integrated photonics receiver may also comprise an input optical port (e.g., an edge coupler) optically connected to the input of the polarization splitter rotator, for example. Optical light entering the integrated photonics receiver, as an example, may be polarized by the polarization splitter rotator, such that the separated transverse-electric (TE) and transverse-magnetic (TM) polarization modes of the optical light may enter the photodetector via the two input ports, respectively, wherein the TE and TM polarization modes may then be combined, for example. A drawback of using such an integrated photonics receiver is that the optical light may not be fully absorbed in the photodetector, allowing the unabsorbed optical light to travel through the opposite port (i.e., an opposite port of the two input ports of the photodetector) of the photodetector, respectively, and propagate back toward the input optical port of the integrated photonics receiver, which may degrade the optical return loss of the integrated photonics receiver, as an example.

An alternative approach to the one described above involves the use of a phase control element and an optical combiner, for example. As an example, a polarization insensitive integrated photonics receiver may comprise a 1×2 polarization splitter rotator optically connected to a phase tuner and a 2×1 combiner, respectively, and a single-input photodetector. The integrated photonics receiver may also comprise an input optical port (e.g., an edge coupler) optically connected to the input of the polarization splitter rotator, for example. Optical light entering the integrated photonics receiver, as an example, may be polarized by the polarization splitter rotator, such that the transverse-electric and transverse-magnetic polarization modes of the optical light are separated. One of the split polarization modes may propagate through the phase tuner, which, via active phase control algorithms programmed to control the phase of the polarization mode of light, may tune the phase of the one of the split polarization modes. The phase-matched TE and TM polarization modes may then combine constructively via the 2×1 combiner, for example, before being directed to the photodetector. Thus, as mentioned above, a drawback of using such an integrated photonics receiver is that active phase control algorithms may be required for effectively operating the phase tuner, which may be costly.

Therefore, there is a need to solve the problems described above by providing a dual-mode integrated photonics receiver based on two photodetectors connected in parallel, and having integrated dispersion compensator devices, and method of same, for effectively and efficiently absorbing optical light.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated receiver chip is provided. The integrated receiver chip may comprise: a first end and a second end; at least one optical input port disposed at the first end; a polarization manipulation device optically connected to one of the at least one optical input port, the polarization manipulation device being adapted to split an optical signal into a first and a second optical signals; a first and a second dispersion compensators each optically connected to the polarization manipulation device, the first and the second dispersion compensators each being adapted to selectively induce a dispersion on an optical signal propagating through the dispersion compensator; and a first and a second photodetectors optically connected to the first and the second dispersion compensators, respectively. The optical paths from the optical input port to the first and the second photodetectors are arranged with significantly equal length for maximizing the combined optical to electrical signal conversion. Additionally, the optical paths are significantly identical in terms of propagation delay to achieve constructive signal combining. Thus, an advantage of using two parallelly connected photodetectors in the disclosed receiver is that the optical signal clarity may be maximized, which may improve upon the return loss of traditional receivers. Another advantage is that, because of the use of the first and the second photodetectors, conventionally used optical components, such as phase tuners and combiners, may be no longer be needed, which may reduce associated manufacturing costs. Another advantage is that, because the phase tuner may be negated, a control algorithm adapted to control the phase tuner is no longer needed either, which may simplify operation of the receiver and thus reduce associated operational costs. Thus, an advantage is that the disclosed dispersion compensator structure may enable large amounts of dispersion tuning for an integrated receiver chip, which may thus improve data transmission reach. An additional advantage is that, because the dispersion compensator design is simplified, manufacturing costs associated with integrating the dispersion compensator onto an integrated receiver chip may thus be reduced.

In another aspect, an optical to electrical (OE) conversion system is provided. The OE conversion system may comprise an integrated receiver chip, a transimpedance amplifier, and a digital signal processor (DSP), the transimpedance amplifier and the digital signal processor each being in electrical communication with the integrated receiver chip, the integrated receiver chip comprising at least one optical input port disposed at a first end of the integrated receiver chip, a first and a second dispersion compensators each optically connected to one of the at least one optical input port, the first and the second dispersion compensators each being adapted to selectively induce a dispersion on an optical signal propagating through the dispersion compensator, and a first and a second photodetectors optically connected to the first and the second dispersion compensators, respectively; wherein, when an optical signal is launched into the integrated receiver chip at one of the at least one optical input port, the first and the second dispersion compensators induce a selected dispersion on the optical signal, the optical signal being absorbed by each of the first and the second photodetectors, such that a photocurrent of the optical signal is electrically transmitted to the transimpedance amplifier by each of the first and the second photodetectors, the transimpedance amplifier being configured to convert the photocurrent to a voltage signal; and wherein the DSP is configured to monitor the inducing of the dispersion on the optical signal by digitally reading a bit error rate of the voltage signal being outputted from the transimpedance amplifier, the DSP being further configured to transmit a control signal to each of the first and the second dispersion compensators for selectively adjusting a value of the induced dispersion. Thus, an advantage of using two parallelly connected photodetectors in the disclosed receiver is that the optical signal clarity may be maximized, which may improve upon the return loss of traditional receivers. Another advantage is that, because of the use of the first and the second photodetectors, conventionally used optical components, such as phase tuners and combiners, may be no longer be needed, which may reduce associated manufacturing costs. Another advantage is that, because the phase tuner may be negated, a control algorithm adapted to control the phase tuner is no longer needed either, which may simplify operation of the receiver and thus reduce associated operational costs. An additional advantage is that the dispersion compensator design is simplified, which may thus reduce manufacturing costs associated with integrating the dispersion compensator onto an integrated receiver chip.

In another aspect, a method of enabling dispersion compensation on an integrated receiver chip having a first and a second photodetectors is provided. The method may comprise the steps of integrating a first and a second dispersion compensators on the integrated receiver chip, the first and the second dispersion compensators being optically connected to the first and the second photodetectors, respectively, and providing a digital signal processor (DSP) in electrical communication with the first and the second dispersion compensators, the DSP being programmed to scan through predefined dispersion parameters for each of the first and the second dispersion compensators, digitally read a bit error rate (BER) from a voltage signal, the voltage signal being received from a transimpedance amplifier in electrical communication with the first and the second photodetectors, evaluate the read BER, such that to determine a sufficiency of the predefined dispersion parameters, and if the evaluation of the read BER yields insufficiency, adjust the predefined dispersion parameters to a tuned dispersion parameters, scan through the tuned dispersion parameters for each of the first and the second dispersion compensators, digitally read a bit error rate (BER) from a voltage signal, the voltage signal being received from the transimpedance amplifier in electrical communication with the first and the second photodetectors, and evaluate the read BER, such that to determine a sufficiency of the tuned dispersion parameters. Thus, an advantage is that the disclosed dispersion compensator structure may enable large amounts of dispersion tuning for an integrated receiver chip, which may thus improve data transmission reach. An additional advantage is that the dispersion compensator design is simplified, which may thus reduce manufacturing costs associated with integrating the dispersion compensator onto an integrated receiver chip. Another advantage is that, because of the DSP with FEC feedback loop, the tuning of the tunable dispersion compensator may be autonomously controlled and adjusted, as needed, in real time.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105A and 205A, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
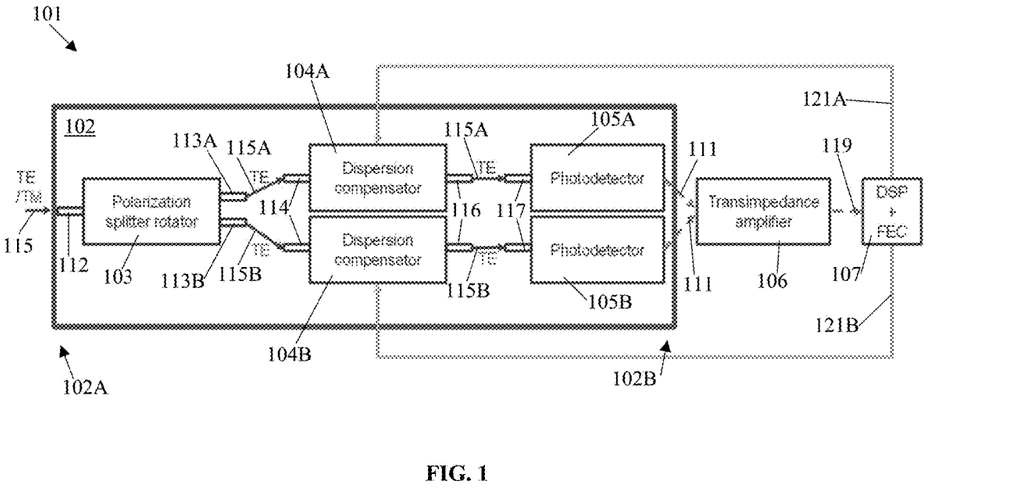
FIG. 1 is a diagram illustrating a top view of an optical-to-electrical conversion system comprising an integrated photonics receiver chip, a transimpedance amplifier, and a digital signal processor, according to an aspect.

FIG. 1 is a diagram illustrating a top view of an optical-to-electrical conversion system 101 comprising an integrated photonics receiver chip 102, a transimpedance amplifier 106, and a digital signal processor 107, according to an aspect. As described previously in the Background above, an integrated photonics receiver may be configured to receive optical light, such that the optical light may be absorbed by a photodetector contained within the receiver, as an example. The absorbed optical light may be converted to an electrical signal within the photodetector, and the electrical signal may be electrically transmitted to a transimpedance amplifier (e.g., a photocurrent to voltage converter), for example, contained within an electrical chip/die positioned at or near an output of the integrated photonics receiver. As will be described throughout this disclosure below, an improved integrated photonics receiver may be provided having two photodetectors and dispersion compensators, as an example, to enable a more effective and efficient optical-to-electrical conversion. It should be noted that the disclosed optical-to-electrical conversion system 101 of FIG. 1 is configured to utilize direct detection in the conversion of the absorbed optical light into an electrical signal.

As shown in FIG. 1, the integrated photonics receiver chip ("integrated photonics receiver chip," "integrated photonics receiver," "receiver," "receiver chip") 102 may be provided with a polarization splitter rotator 103, a first and a second dispersion compensators 104A and 104B, and a first and a second photodetectors 105A and 105B, as an example. As shown as an example, the polarization splitter rotator 103 may be provided with an input optical port 112 disposed at a first end ("first end," "input end," "input") 102A of the receiver chip 102, and a first and a second output optical ports 113A and 113B. As will be described in more detail later, the input port 112 may be adapted to receive an optical signal 115, as an example. As shown, the first and the second dispersion compensators 104A and 104B may each be provided with an input port 114, each optically connected (via optical waveguides/channels (not shown)) to the polarization splitter rotator output ports 113A and 113B, respectively. Additionally, the first and the second dispersion compensators 104A and 104B may each further comprise an output port 116, as shown. The first and the second photodetectors 105A and 105B may each be provided with an input port 117, as shown, each optically connected (via optical waveguides/channels (not shown)) to the output port of each of the first and the second dispersion compensators 104A and 104B, respectively, as an example. Finally, as shown, an output of each of the first and the second photodetectors 105A and 105B may be electrically connected (via electrical connections 111) to the transimpedance amplifier 106, which will be described in more detail later.

As shown in FIG. 1, the first and the second photodetectors 105A and 105B may be electrically connected in parallel (e.g., at 111), such that photocurrents from the first and the second photodetectors, corresponding to the TE and TM polarizations of two optical signals (e.g., 115A and 115B), for example, may be constructively combined, as will be discussed in more detail later. As can be seen in FIG. 1, each photodetector 105a, 105b may be configured to operate as a single polarization waveguide photodetector. As mentioned above, the first and the second photodetectors 105A and 105B may electrically connect to the transimpedance amplifier 106. As an example, the transimpedance amplifier 106 may be contained within an electrical chip positioned at or near a second end ("second end," "output end," "output") 102B of the receiver chip 102, as will be discussed in more detail when referring to FIG. 2. It should be noted that the first end 102A and second end 102B are shown opposite each other in FIG. 1, the first end 102A and second end 102B may also be disposed in alternate ways, such as at a right angle with respect to each other.

As shown in FIG. 1, the transimpedance amplifier 106 may be electrically connected (via electrical connection 119, for example) to a digital signal processor (DSP) 107. The digital signal processor 107 may be an application-specific integrated circuit (not shown) integrated on the electrical chip with the transimpedance amplifier 106, as an example. As will be described in more detail later in this disclosure below, the digital signal processor 107 may be provided with forward error correction capabilities, such that the DSP 107 can provide digital feedback via electrical signals ("electrical signals," "digital signal," "control signals") 121A and 121B, for example, to each of the first and the second dispersion compensators 104A and 104B, respectively, for automating the control of the dispersion compensators, for example.

As shown as an example in FIG. 1, an optical signal 115 having TE and TM polarization modes may be launched into the receiver 102 at the input optical port 112 of the polarization splitter rotator 103. As indicated, within the polarization splitter rotator 103, the optical signal 115 is split into two signals, such the split optical signals 115A and 115B exiting the output optical ports 113A and 113B, respectively. The TM polarization mode of the optical signal 115 may be split and rotated to TE polarization and exit the output optical port 113B and the TE polarization mode of the optical signal 115 may be split and keep TE polarization and exit the output optical port 113A, as an example. As an example, the polarization splitting and rotation (within 103, for example) may be achieved either by an edge coupler (not shown) with a suitable integrated polarization splitter rotator device or by a dual-polarization grating coupler (not shown). As shown, the split optical signals 115A and 115B may propagate toward and enter the first and the second dispersion compensators 104A and 104B, respectively, via the input ports 114, as an example. As will be described in greater detail later in this disclosure, the first and the second dispersion compensators 104A and 104B may, using the DSP feedback loop (realized via digital signals 121A and 121B), may enable the receiver chip 102 to reduce/compensate for dispersion (e.g., chromatic dispersion, intermodal dispersion, polarization mode dispersion) incurred by the optical signals 115A and 115B being received by the parallel photodetectors 105A and 105B, respectively, as an example. It should be understood that the optical paths from the optical input port 112 to the first and the second photodetector input ports 117 are arranged with significantly equal length, i.e., significantly identical in terms of propagation delay, to achieve constructive signal combining, as disclosed in greater detail hereinafter.

Figure 2:
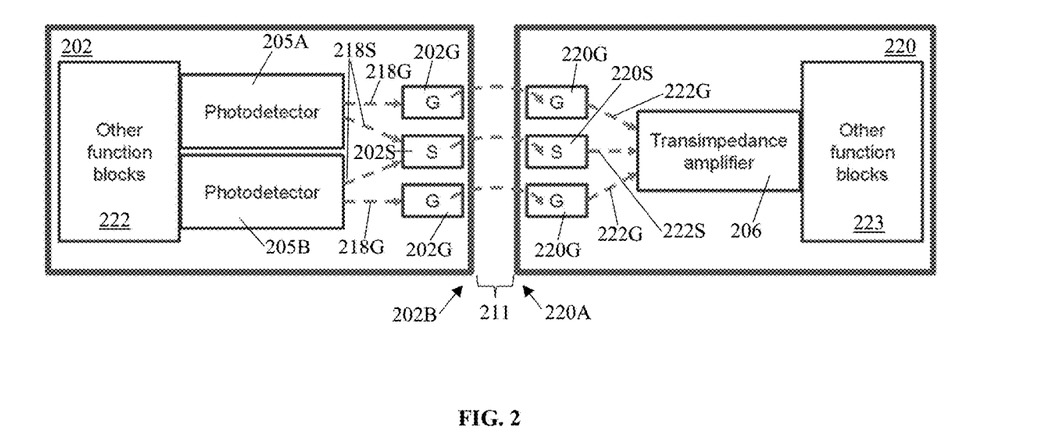
FIG. 2 is a diagram illustrating a top view of exemplary electrical connections between the photodetectors of the integrated photonics receiver chip and the transimpedance amplifier of FIG. 1, according to an aspect.

FIG. 2 is a diagram illustrating a top view of exemplary electrical connections 211 between the photodetectors 105A and 105B of the integrated photonics receiver chip 102 and the transimpedance amplifier 106 of FIG. 1, according to an aspect. As mentioned previously above when referring to FIG. 1, the first and the second photodetectors 205A and 205B may be electrically connected to the transimpedance amplifier 206, which may be integrated on an electrical chip 220, as shown in FIG. 2, as an example. As will be described in detail below, the first and the second photodetectors 205A and 205B may be electrically connected to the transimpedance amplifier 206 in parallel, such that the photocurrents being electrically transmitted from each of the first and the second photodetectors 205A and 205B may be combined.

As an example, let the function blocks module 222 represent each of the additional exemplary optical components of the receiver chip 202 shown previously in FIG. 1, such as the dispersion compensators (104A and 104B) and the polarization splitter rotator (103), for example. Similarly, let the function blocks module 223 represent each of the additional exemplary electrical components of the electrical chip 220 shown previously in FIG. 1, such as the DSP (107) and feedback loop (121A and 121B), for example. As shown as an example, the receiver chip 202 may further comprise a signal pad 202S (labeled S) and a pair of ground pads 202G (labeled G) disposed along the second end 202B, such that a GSG pad configuration is formed at the output end 202B of the receiver chip 202. It should be noted that the receiver chip 202 can also be configured with a single ground pad instead of pairs. The GSG pad configuration of the receiver 202 may thus model the GSG pad configuration of a traditional transimpedance amplifier, as an example. As such, as shown in FIG. 2, the electrical chip 220 may be provided with a signal pad 220S and a pair of ground pads 220G disposed at a first end 220A of the electrical chip 220, such that the GSG configurations of both receiver and electrical chips 202 and 220, respectively, are parallelly aligned. As an example, the first and the second photodetectors 205A and 205B may be electrically connected to each of the electrical pads via signal traces (e.g., copper traces) etched into the receiver chip 202. As such, for example, the first and the second photodetectors 205A and 205B may each electrically connect to one of the pair of ground pads 202G via signal trace 218G and to the signal pad 202S via signal trace 218S, respectively, as shown. Finally, as shown, each corresponding pair of electrical pads between the receiver 202 and the electrical chip 220 may be electrically connected via the electrical connections 211 (e.g., wires), such that ground pads 202G electrically connect to ground pads 220G, and signal pad 202S electrically connects to signal pad 220S, as an example.

As mentioned above, the GSG pad configuration electrically connected to the first and the second photodetectors 205A and 205B may match the conventional GSG pad configuration of the transimpedance amplifier 206, for example. As shown in FIG. 2, the transimpedance amplifier 206 may be electrically connected to the ground pads 220G via signal traces 222G, for example, and to the signal pad 220S via signal trace 222S. Thus, a secure electrical link is formed from each of the first and the second photodetectors 205A and 205B to the transimpedance amplifier 206, as shown. As is known, an optical photodetector is adapted to absorb optical light and convert the absorbed optical light into an electrical signal (i.e., a photocurrent, for example). As discussed previously in the Background above, traditional optical receivers comprise a single photodetector having two inputs. As described throughout this disclosure herein above, the optical receiver 202 may comprise two parallelly aligned, single-input photodetectors (205A and 205B, for example). The use of the first and the second photodetectors 205A and 205B, as compared to the traditional single photodetector, helps mitigate channel impediments (e.g., waveguide impurities, reflection, loss) by ensuring fuller optical absorption, such that to maximize the optical signal clarity at the output (at the transimpedance amplifier 206, for example). Thus, an advantage of using two parallelly connected photodetectors in the disclosed receiver is that the optical signal clarity may be maximized, which may improve upon the return loss of traditional receivers.

As mentioned above, an electrical link (i.e., an electrical circuit) may be formed between each of the first and the second photodetectors 205A and 205B and the transimpedance amplifier 206 via the electrically connected and paired GSG pads, respectively. As an example, as similarly shown previously in FIG. 1, let an optical signal (e.g., 115 in FIG. 1) be launched into the optical receiver 202. As mentioned previously above, the optical signal may be split into two optical signals and each having the same polarization (TE polarization, for example). Within the first and the second photodetectors 205A and 205B, each of the split optical signals, respectively, may be absorbed, and a photocurrent (not shown) corresponding to each of the optical signals may be outputted from the first and the second photodetectors 205A and 205B. As an example, the two photocurrents (not shown) may be electrically transmitted, via the signal traces 218S, for example, to the signal pad 202S, where the two photocurrents may be combined constructively into a single photocurrent. The single photocurrent (not shown) may travel electrically between the signal pads 202S and 220S, via the electrical connection 211, for example, and the single photocurrent may electrically flow from the signal pad 220S into the transimpedance amplifier 206 via the signal trace 222S. The transimpedance amplifier 206 may then convert the single photocurrent into a voltage signal (not shown), as an example.

Thus, as outlined above, the use of the first and the second photodetectors 205A and 205B and the electrically connected GSG pads (202G and 202S), respectively, may not only improve the optical reflection issues traditionally experienced by conventional receivers, but may also negate the need for using phase tuners and combiners to control the optical signal's phase, as outlined previously in the Background above. Thus, an advantage is that, because of the use of the first and the second photodetectors, conventionally used optical components, such as phase tuners and combiners, may be no longer be needed, which may reduce associated manufacturing costs. Another advantage is that, because the phase tuner may be negated, a control algorithm adapted to control the phase tuner is no longer needed either, which may simplify operation of the receiver and thus reduce associated operational costs.

Figure 3A:
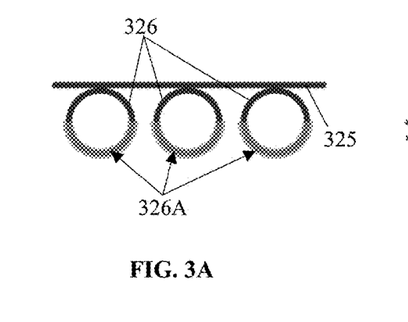
FIGS. 3A-3B illustrate top views of exemplary tunable dispersion compensator structures, realized by cascaded ring resonators and cascaded Mach-Zehnder interferometers, respectively, according to an aspect.
Figure 3B:
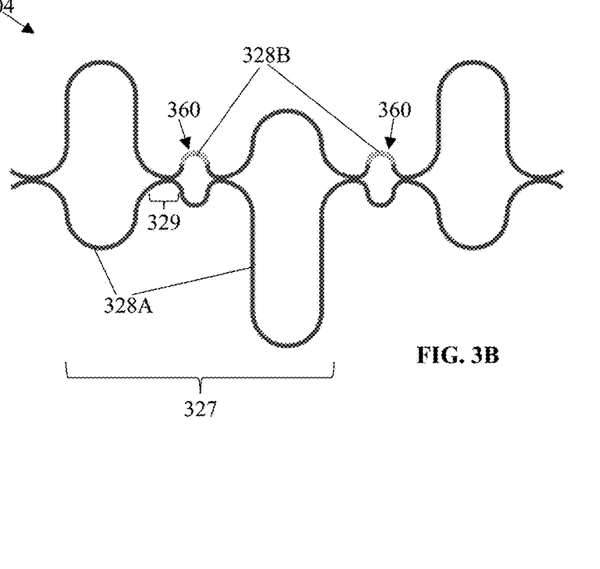

FIGS. 3A-3B illustrate top views of exemplary tunable dispersion compensator structures 304, realized by cascaded ring resonators 326 and cascaded Mach-Zehnder interferometers 327, respectively, according to an aspect. As described previously throughout this disclosure above, the integrated receiver chip (e.g., 102 in FIG. 1) may be provided with a first and a second dispersion compensators (e.g., 104A and 104B in FIG. 1) parallelly connected to the first and the second photodetectors (e.g., 105A and 105B), respectively. As an example, each of the first and the second dispersion compensators may be or may comprise a tunable dispersion compensator (e.g., 532 in FIG. 5). The tunable dispersion compensators 304 may be an integrated optical tunable filter, which is capable of compensating phase distortion of light signals 115 caused by optical fiber dispersion. As will be described in detail below, the tunable dispersion compensator may be implemented using either cascaded ring resonators 326 or cascaded Mach-Zehnder interferometers (MZIs) 327, as an example.

As shown in FIG. 3A, the tunable dispersion compensator 304 may be realized by cascaded ring resonators 326, as an example. Such ring resonators 326 may be constructed using silicon photonics technology, for example, and be optically connected to a silicon waveguide 325, resulting in the cascaded arrangement shown, as an example. The cascaded ring resonators 326 may be integrated onto an optical channel of the receiver chip (e.g., 102 in FIG. 1), such that optical light being launched into the receiver chip may be propagated and coupled into each ring resonator 326, and thus resulting in a tuning of the dispersion of the optical light. Tuning the dispersion of the optical light may be performed by tuning the resonance frequency of the ring resonator 326 with phase turners 326A. As an example, the phase tuners 326A may each be a thermo-optic phase shifter, which can change the resonance frequency of the ring resonator 326. Alternatively, as shown in FIG. 3B, the tunable dispersion compensator 304 may be realized by cascaded MZIs 327, as an example. As shown in FIG. 3B, the tunable dispersion compensator is composed of cascaded alternating symmetrical and asymmetrical MZIs as shown by 328B and 328A, respectively, for example. Furthermore, each MZI 327 may be optically connected such that the output ports of a first MZI optically connect to the input ports of an adjacent second MZI, as shown at 329, for example, and such that to form the cascaded arrangement shown. As an example, the cascaded MZIs 327 may be integrated onto an optical channel of the receiver chip (e.g., 102 in FIG. 1), such that optical light being launched into the receiver chip may be propagated through each MZI (e.g., 328A, 328B). The symmetric MZIs (inter couplers) 328B function as tunable couplers for guiding the path on which the optical signal will take, while the asymmetric MZIs (outer couplers) 328A function as the dispersive element. The two outer couplers 328A may be set to 50% coupling ratio. Controlling the coupling ratio of the inter couplers 328B will result in a tuning of the dispersion applying to the optical light. As an example, the coupling ratios of the inter couplers 328B may be controlled by phase tuners 360, which may each be a thermo-optic phase shifter. It should be understood that either structure 304 may be configured to receive a control signal for causing a tuning of the dispersion, for example.

Figure 4:
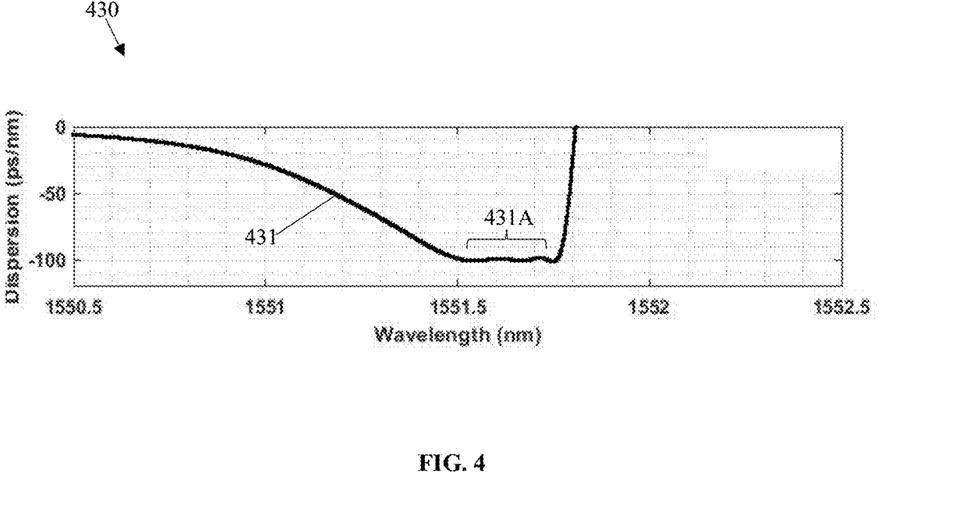
FIG. 4 is an exemplary plot illustrating a simulation of the tunable dispersion compensator with cascaded ring topology depicted in FIG. 3A according to an aspect.

FIG. 4 is an exemplary plot 430 illustrating a simulation of the tunable dispersion compensator comprising cascaded ring resonators illustrated in FIG. 3A according to an aspect. As described previously above when referring to FIGS. 3A-3B, the integration of a dispersion compensator structure (e.g., cascaded ring resonators or cascaded MZIs) may enable the dispersion of a propagating optical signal on the integrated receiver chip (e.g., 102 in FIG. 1) to be tuned, as an example. As shown in FIG. 4, the plot 430 illustrates a dispersion curve ("dispersion curve," "simulation curve") 431, measured in picoseconds/nanometer (ps/nm), as indicated on the y-axis, against increasing values of wavelength, measured in nm, as indicated on the x-axis, for example. As mentioned above, the exemplary dispersion curve 431 shown in FIG. 4 was obtained via a simulation of a dispersion compensator using cascaded ring topology illustrated in FIG. 3A.

As shown by the dispersion curve 431 in FIG. 4, for a single dispersion compensator device (e.g., 104A in FIG. 1), the amount of dispersion compensation provided can be up to −100 ps/nm, which may occur at 1551.5 nm (along the x-axis), for example, and remain for about such that the optical bandwidth 431A is about 0.5 nm, as an example. Within the bandwidth region 431A, for example, the phase ripples may be smaller than 0.1 radians, which may be preferred for optimal compensator functionality. Ideally, the optical bandwidth 431A should preferably be as wide as feasibly possible, for example. Thus, as shown by the simulation curve 431 of FIG. 4, the amount of dispersion of a propagating optical signal can be tuned by an effectively configured dispersion compensator, such that the dispersion compensation can be adjusted to compensate for changes in temperature in the optical transmission system or for a fiber length variation, for example. However, it should be noted that a trade-off between the dispersion compensation capability and the optical bandwidth needs to be considered when implementing such dispersion compensator devices, for example.

Figure 5:
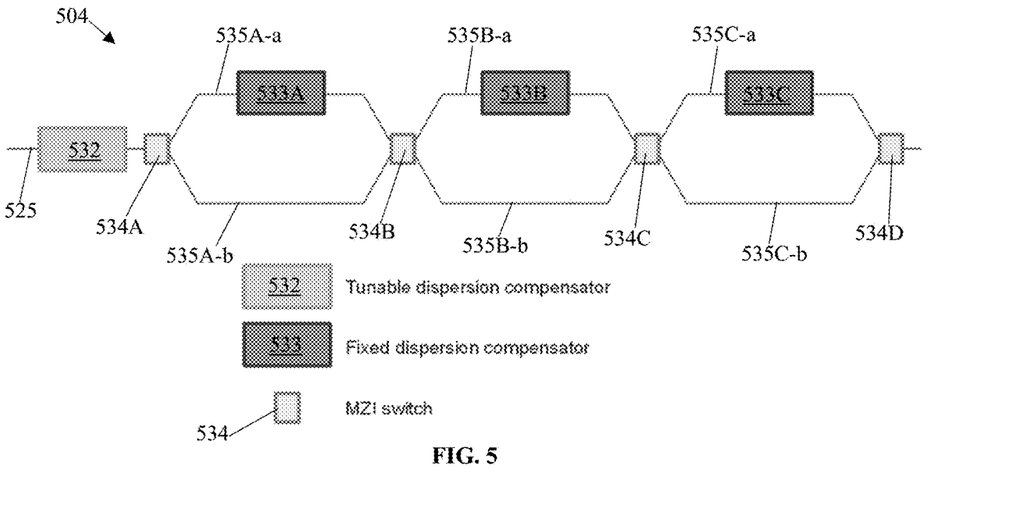
FIG. 5 is a diagram illustrating a top view of cascaded Mach-Zehnder interferometer switches with multiple dispersion compensators, according to an aspect.

FIG. 5 is a diagram illustrating a top view of cascaded Mach-Zehnder interferometer switches 534 with multiple dispersion compensators 532, 533, according to an aspect. As described previously above when referring to FIGS. 3A— 3B, cascaded ring resonators (e.g., 326) or cascaded MZIs (e.g., 327) can be used to implement a dispersion compensator structure, as an example. Additionally, as described previously above when referring to FIG. 4, such a dispersion compensator structure may be capable of providing up to −100 ps/nm of dispersion compensation. As will be described in detail below, for applications requiring larger amounts of dispersion tuning (e.g., long transmission, or high-speed applications) where a single dispersion compensator structure may not suffice, cascaded MZI switches paired with multiple types of dispersion compensator devices may alternatively be provided to form another dispersion compensator structure 504 (e.g., in place of 104A, 104B in FIG. 1), as an example.

As shown in FIG. 5, multiple-stage MZI switches 534 may be integrated with three fixed dispersion compensators 533, as an example, to form the dispersion compensator structure 504. As shown as an example, let the structure 504 be optically connected to an optical waveguide 525 integrated on an optical receiver chip (e.g., 102 in FIG. 1). As shown, a tunable dispersion compensator 532 (based on either structure 304 shown previously in FIGS. 3A-3B, for example) may be provided on the optical waveguide 525, as an example. For example, the tunable dispersion compensator 532 may be adapted to provide dispersion in a range from 0 to D, where D is an amount of dispersion (e.g., 100 ps/nm). As shown, following the tunable dispersion compensator 532, a first MZI switch 534A may be optically connected to an output of the tunable dispersion compensator 532, as shown. As an example, the first MZI switch 534A may be implemented as a 1×2 MZI structure, such that the first MZI switch 534A has one input and two outputs, as shown, branching into an upper and a lower arms 535A-a and 535A-b, respectively, for example. As shown, the upper arm 535A-a may be provided with a first fixed dispersion compensator 533A. As an example, the first fixed dispersion compensator 533A may be adapted to provide a fixed dispersion of D, again, where D is an amount of dispersion (set by the tunable dispersion compensator 532). As shown, the upper and lower arms 535A-a and 535A-b may optically connect to the inputs, respectively, of a second MZI switch 534B, as an example.

As an example, the second MZI switch 534B may be implemented as a 2×2 MZI structure, as shown, such that the second MZI switch 534B has two inputs and two outputs, for example, branching into an upper and a lower arms 535B-a and 535B-b, respectively. As shown, the upper arm 535B-a may be provided with a second fixed dispersion compensator 533B. As an example, the second fixed dispersion compensator 533B may be adapted to provide a fixed dispersion of 2*D. As shown, the upper and lower arms 535B-a and 535B-b may optically connect to the inputs, respectively, of a third MZI switch 534C, as an example. As an example, the third MZI switch 534C may be implemented as a 2×2 MZI structure, as shown, such that the third MZI switch 534C has two inputs and two outputs, for example, branching into an upper and a lower arms 535C-a and 535C-b, respectively. As shown, the upper arm 535C-a may be provided with a third fixed dispersion compensator 533C. As an example, the third fixed dispersion compensator 533C may be adapted to provide a fixed dispersion of 4*D. Finally, as shown, the upper and lower arms 535C-a and 535C-b may optically connect to the inputs, respectively, of a fourth MZI switch 534D, as an example. As an example, the fourth MZI switch 534D may be implemented as a 2×1 MZI structure, as shown, such that the fourth MZI switch 534D has two inputs and a single output, for example.

As outlined above, the cascading of multiple MZI switches 534 each paired with a fixed dispersion compensator 533, for example, may form a dispersion compensator structure 504 for accommodating applications requiring large amounts of dispersion tuning. As an example, each of the MZI switches 534 may be controlled (autonomously by an external signal, for example), such that optical light can selectively propagate through a portion of or all of the fixed dispersion compensators 533. For example, as mentioned above, the tunable dispersion compensator 532 may be tuned to a certain dispersion from 0 to D (by the external signal, for example), which may then, subsequently, determine each of the dispersion values for the first, second, and third fixed dispersion compensators 533A-533C, respectively. Then, as an optical signal (not shown) is propagated through the structure 504, each of the MZI switches 534 may be individually controlled. Referring to the first MZI switch 534A, optical light may be directed onto either the upper arm 535A-a, such that to then pass through the first fixed dispersion compensator 533A, or the lower arm 535A-b, such that to avoid the first fixed dispersion compensator 533A. Each of the second and the third MZI switches 534B and 534C may be controlled in the same way, for example, such that the optical light may be directed onto either of each of the upper arms 535B-a, 535C-a or lower arms 535B-b, 535C-b, respectively, as the optical light propagates through the structure 504. As mentioned previously above, in this way, the optical light may be selectively subject to increasing amounts of dispersion, induced by the dispersion compensators 533, by the controlling of the MZI switches 534.

As outlined above, from front end to back end in the dispersion compensator structure 504, optical light may selectively achieve continuous tuning of dispersion in a large range from 0 to 8*D. As noted above, only a single dispersion compensator has to be configured as a tunable dispersion compensator (e.g., 532) tunable in the range from 0 to D, for example. As such, by the use of the above-described structure 504, there is no need to configure a dispersion compensator to be tunable in a range from 0 to 8*D, which would be challenging and costly. Thus, the design of the tunable dispersion compensator may be simplified. As an example, for 100G PAM4 Dense Wave Division Multiplexing (DWDM) applications, data transmission reach may only extend to about 2 kilometers (km), without dispersion compensation. Utilizing the cascaded dispersion compensators in the exemplary formation described above, the data transmission reach may be improved significantly, extending to about 40 km, for example. Thus, an advantage is that the disclosed dispersion compensator structure may enable large amounts of dispersion tuning for an integrated receiver chip, which may thus improve data transmission reach. An additional advantage is that the dispersion compensator design is simplified, which may thus reduce manufacturing costs associated with integrating the dispersion compensator onto an integrated receiver chip.

As an example, in certain applications where even greater amounts of dispersion compensation are required (e.g., greater than 8*D), an external dispersion compensation module can be optically paired with the on-chip integrated dispersion compensator (e.g., 104A, 104B in FIG. 1). As such, the combination of the external dispersion compensation module with the on-chip integrated dispersion compensator may relax the dispersion compensation requirements of each component, respectively. Moreover, additional fixed dispersion compensators may be added, for example, to enable a more flexible dispersion compensation mechanism. It should be understood that the number of optical components, such as the tunable dispersion compensators 532 and the MZI switches 534, for example, shown in FIG. 5, is exemplary, and thus the number of such optical components may be increased or decreased, for example. It should also be understood that the dispersion compensation structure 504 shown in FIG. 5 may be provided as the first and the second dispersion compensators 104A and 104B of FIG. 1, as an example.

Figure 6:
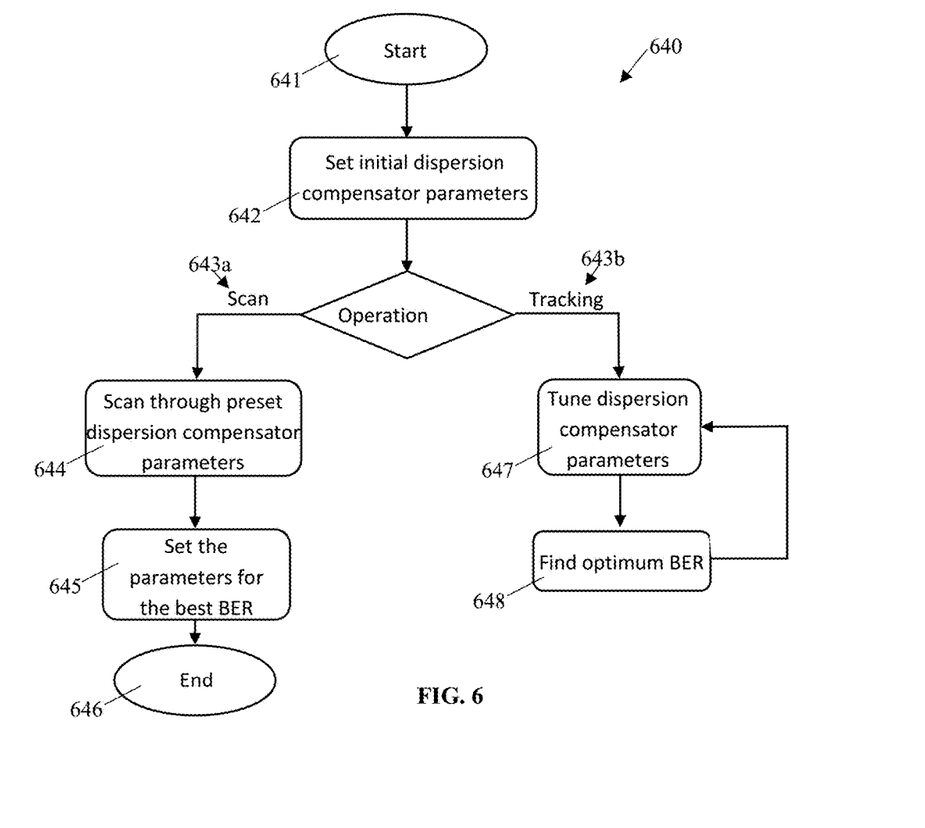
FIG. 6 is a flowchart illustrating an exemplary control algorithm for controlling the tunable dispersion compensator of FIG. 1, according to an aspect.

FIG. 6 is a flowchart illustrating an exemplary control algorithm 640 for controlling the tunable dispersion compensator 104A, 104B of FIG. 1, according to an aspect. As mentioned previously above when referring to FIG. 1, the integrated receiver chip (e.g., 102) may electrically communicate with the transimpedance amplifier (e.g., 106), which may further electrically communicate with a DSP module (e.g., 107). As described previously, the DSP module may be adapted to receive the voltage signal (i.e., converted photocurrent) from the transimpedance amplifier, and be provided with forward error correction (FEC) capabilities to facilitate the tuning of the first and the second dispersion compensators (e.g., 104A and 104B) for optimum link performance, as an example. As will be described in detail below, the DSP module may be programmed with the exemplary control algorithm 640 for effectively and autonomously control the tuning of the dispersion compensators.

As shown in FIG. 6, upon startup of the DSP module (i.e., operating the electrical chip (e.g., 220 in FIG. 2)), indicated at 641 in FIG. 6, the DSP module may set the initial dispersion compensator parameters, indicated at 642. Then, the DSP module may first enter the scan operation mode, indicated at 643a, as disclosed in greater detail hereinbelow. Then, after the scan operation mode program has ended, indicated at 646, the DSP module may use the tracking operation mode, indicated at 643b, in combination with the scan operation mode (step 643a) to tune (step 647) and find (step 648) the optimum bit error rate (BER), as disclosed in greater detail hereinafter.

After, the DSP module enters the scan operation mode 643a, the DSP module may scan through the preset dispersion compensation parameters, indicated by 644. As described previously above when referring to FIG. 5, the tunable dispersion compensator structure (e.g., 504) may be thus configured such that the dispersion is tuned in a range from 0 to D using 532 of FIG. 5 (or 0 to 8*D, including the fixed dispersion compensators (e.g., 533)), for example. As an optical signal (e.g., 115) propagates along the optical receiver (e.g., 102) and through the tunable dispersion compensators (as well as any fixed dispersion compensators (e.g., 533)), the optical signal may be subject to dispersion, as defined by the value of D, for example. Once the optical signal passes through the photodetectors (e.g., 105A and 105B), the optical signal may be electrically transmitted (as a photocurrent, for example) to the transimpedance amplifier 106/206, as described previously above when referring to FIG. 2. The transimpedance amplifier may convert the photocurrent of the originally received optical signal, for example, into a voltage signal that may be electrically processed by the DSP 107, for example. As mentioned above, the DSP may be provided with FEC functionality for monitoring the OE link between the receiver and transimpedance amplifier via the bit error rate (BER). As shown in FIG. 6, the DSP may process the voltage signal, obtain the OE link bit error rate (BER), then set the dispersion compensator parameters 104 A-B for the best BER, a step indicated at 645. It should be noted that the OE link BER may be hindered by impairments of the optical link, such as, for example, reflection, fiber dispersion, etc. Then, the program may end, as indicated by step 646, or enter tracking operation mode.

Upon entering tracking operation mode, indicated by 643b, the DPS module may set the dispersion compensator parameters which are found in step 645 with the best BER or the initial dispersion compensator parameters from the step 642 if the parameters with the best BER from the scan operation mode are not available. As shown in FIG. 1, the DSP (107) may obtain BER and generate control signals (121A and 121B), which may be electrically transmitted to the first and the second dispersion compensators (104A and 104B), respectively, for example. The control signals may then cause a tuning of the tunable dispersion compensators, such that the dispersion may be set to a new value in the range between 0 and D (or 0 and 8*D), indicated at step 647. As the optical signal is propagated through the OE conversion system (101) of FIG. 1, a new photocurrent will be generated, and thus a new voltage signal, which will be electrically sent to the DSP, as an example. As before, the DSP will obtain the BER of the new voltage signal. Subsequently, the DSP will evaluate the BER value, such that to determine whether the obtained BER is optimum, indicated by step 648. More specifically, the DSP may determine whether the obtained BER yields sufficiency, by, for example, comparing the BER value to a predefined value/threshold. In an example, the BER value should be as low as possible. If the read BER value is insufficient (i.e., worse than the predefined value, for example), then the dispersion compensator parameters will be tuned, indicated at 647, as an example. However, if the read BER value is sufficient (i.e., equal to or better than the predefined value, for example), then no further dispersion compensator tuning may be required. The DSP module may continue to monitor the OE link signal performance. If the BER is worse than the predefined value due to any changes on the optical link, such as, temperature-induced link dispersion changes, it may autonomously start the tuning to find the best operation point for the OE link, indicated by steps 647 and 648.

Again, it should be understood that the tracking operation mode may be used in combination with the scan operation mode to tune and obtain the optimum bit error rate (BER). It should also be understood that the tuning (tracking operation mode) may allow the DSP to continually keep the dispersion compensator parameters set at optimum link BER performance.

Figure 7:
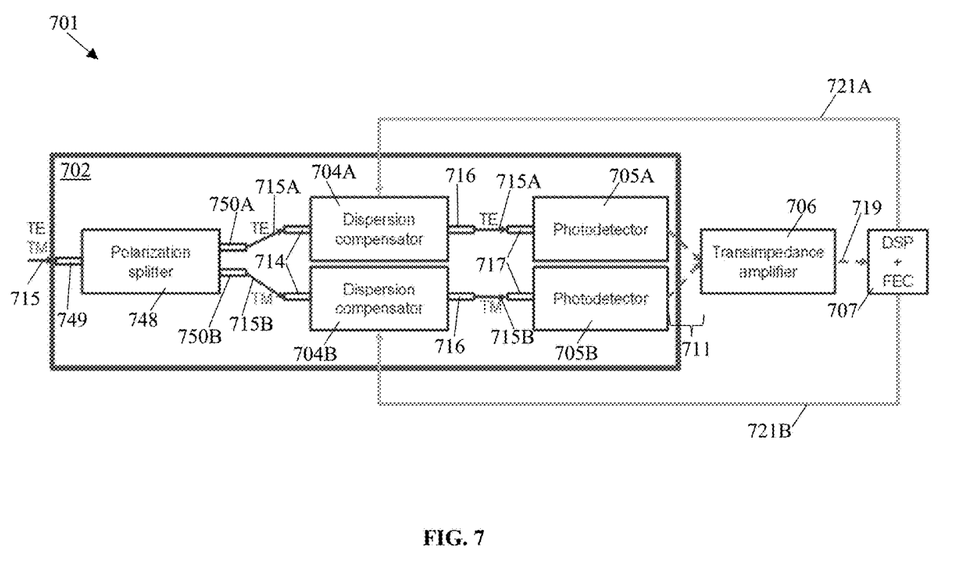
FIG. 7 is a diagram illustrating a top view of an alternative embodiment of the optical-to-electrical conversion system of FIG. 1, according to an aspect.

FIG. 7 is a diagram illustrating a top view of an alternative embodiment 701 of the optical-to-electrical conversion system 101 of FIG. 1, according to an aspect. As described previously above when referring to FIG. 1, the integrated receiver chip (102) may be provided with a polarization splitter rotator (103) adapted to split an optical signal into two optical signals, and rotate the polarization mode of the optical signal, such that the two optical signals possess the same polarization (e.g., TE polarization). As will be discussed in detail below, the polarization splitter rotator may be replaced by a polarization splitter, such that to allow both TM and TE polarizations ("dual-mode") to be propagated along the integrated receiver chip, as an example.

As shown in FIG. 7, the OE conversion system 701 may comprise an integrated receiver chip 702, a transimpedance amplifier 706, and a DSP module 707. As described previously above when referring to FIG. 2, for example, the transimpedance amplifier 706 and the DSP 707 may each be integrated on an electrical chip (e.g., 220) disposed at or near the output of the receiver chip 702, as an example. As shown, the polarization splitter rotator of FIG. 1 may be replaced with the polarization splitter 748, for example, having input port 749 and output ports 750A and 750B, as an example. As similarly described above when referring to FIG. 1, the integrated receiver 702 may comprise a first and a second dispersion compensators 704A and 704B having input and output ports 714 and 716, and a first and a second photodetectors 705A and 705B having input ports 717, respectively, for example. As an example, the output ports 750A and 750B may be optically connected to the input ports 714 of the first and the second dispersion compensators 704A and 704B, respectively, and the output ports 716 of the first and the second dispersion compensators 704A and 704B may be optically connected to the input ports 717 of the first and the second photodetectors 705A and 705B, respectively, as shown. For example, the above-described on-chip optical connections may be made using integrated channels/waveguides (not shown).

As shown as an example in FIG. 7, an optical signal 715 having TE and TM polarization modes may be launched into the receiver 702 at the input optical port 749 of the polarization splitter 748. As indicated, within the polarization splitter 748, the optical signal 715 is split into two signals each having different polarization modes, such the split optical signals 715A and 715B exiting the output optical ports 750A and 750B, respectively, contain TE polarization and TM polarization, respectively, as shown. In comparison with the polarization splitter rotator 103 described previously when referring to FIG. 1, the polarization splitter 749 does not rotate the TM polarization mode of the optical signal 715, as an example, allowing both TE and TM polarizations to be propagated along the optical receiver 702. However, using the polarization splitter 748 in place of the polarization splitter rotator (103) requires that the first and the second dispersion compensators 704A and 704B and the photodetector launch waveguides (e.g., 717) to be polarization insensitive. This requirement may be met by using an optical waveguide having a square frontal cross-section (e.g., square prism shaped waveguide, from a top view) for each of the dispersion compensators and the photodetector launch waveguides, for example. As shown, the split optical signals 715A and 715B may propagate toward and enter the first and the second dispersion compensators 704A and 704B, respectively, via the input ports 714, as an example. As described previously throughout this disclosure above, the first and the second dispersion compensators 704A and 704B may, using the DSP 107 feedback loop (realized via control signals 721A and 721B), may enable the receiver chip 702 to reduce dispersion (e.g., polarization mode dispersion) incurred by the optical signals 715A and 715B being received by the parallel photodetectors 705A and 705B, respectively, as an example. Because each of the optical signals 715A and 715B possesses a different polarization (e.g., TE and TM polarizations, respectively), the TE polarization mode and the TM polarization mode of the input optical signal 715 are compensated by the first and the second dispersion compensators 704A and 704B, respectively, as an example. In this way, because both TE and TM polarization modes are being propagated, the first and the second dispersion compensators 704A and 704B may compensate the polarization mode dispersion (PMD) between the two polarization modes. For example, due to random imperfections and/or asymmetries of the optical waveguides (not shown) of the receiver chip 702 or fiber link, the TE and TM polarizations may propagate along the optical link at different speeds, which may cause optical pulse distortions, and thus reduce data transmission or optical signal clarity, for example. The DSP 707 may be adapted to monitor such instances of PMD (via FEC and BER, for example), such that to control the tuning of the first and the second dispersion compensators 704A and 704B and compensate for the PMD (by speeding up or slowing down one or both polarizations, for example) between the TE and TM polarizations, respectively, as an example. Thus, an advantage of utilizing a polarization splitter is that the polarization mode dispersion may be compensated for the polarizations of an optical signal propagating along the disclosed integrated receiver chip.

It should be understood that the control algorithm shown in FIG. 6 and described previously above may be included in the OE conversion system 701 and programmed on the DSP 707, such that to control the tuning of the first and the second dispersion compensators 704A and 704B, as an example. It should also be understood that the first and the second photodetectors 705A and 705B may be electrically connected to the transimpedance amplifier 706 in the same manner as that shown previously in FIG. 2 (e.g., parallelly paired GSG pad configurations). As an example, the dispersion compensator structures disclosed herein above can be integrated not only on the receiver side, as shown herein, but also on the transmitter side (not shown). Having dispersion compensators integrated on both the transmitter and receiver ends, for example, allows the required total amount of dispersion compensation for either end to be less, and thus also loosens the requirement for the number of cascaded MZI switches (e.g., 534 in FIG. 5).

Furthermore, the disclosed receiver embodiments (e.g., 102 and 702) may be provided as wavelength division multiplexing (WDM) receivers as well. As such, the polarization manipulating component (e.g., 103, 748) may be broadband, and the dispersion compensators can be configured with a wavelength periodic feature to match the channel spacing of multiple wavelengths, as is needed for WDM receivers, for example. The multiplexing feature can be disposed on the receiver chip after the polarization manipulation and dispersion compensator components, for example (i.e., positioned on the chip between components 704A, 704B and 705A, 705B, for example). In this way, only one set of polarization manipulation and dispersion compensator components is needed to accommodate multiple wavelengths on a WDM receiver.

It should be understood that the above-described integrated receiver may be based on various integrated photonics platforms, such as, for example, silicon, silicon nitride, silica, lithium niobate, polymer, III-V materials, hybrid platforms, etc. It should also be understood that the integrated receiver disclosed herein may be adapted for use with multiple wavelength ranges, including, but not limited to, visible light, O, E, S, C, and L-band. It should also be understood that the potential applications of the disclosed invention are not limited to optical communications, but may also include optical sensing, optical computing, automotive applications, quantum applications, etc. For example, the disclosed receiver may be implemented in single-wavelength 100 Gbit/s PAM4 DWDM transceivers in pluggable form factor.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this disclosure, the terms/phrases "optical signal," "optical test signal," "optical light," "laser light," "laser signal," and the like are used interchangeably. It should be understood that the aforementioned terms each individually and collectively refer to light, and more specifically, electromagnetic radiation.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. An integrated receiver chip comprising:
    a first end and a second end;
    at least one optical input port disposed at the first end;
    a polarization manipulation device optically connected to one of the at least one optical input port, the polarization manipulation device being adapted to split an optical signal into a first and a second optical signals;
    a first and a second dispersion compensators each optically connected to the polarization manipulation device, the first and the second dispersion compensators each being adapted to selectively induce a dispersion on an optical signal propagating through the dispersion compensator; and
    a first and a second single polarization waveguide photodetectors optically connected to the first and the second dispersion compensators, respectively, the first and the second single polarization waveguide photodetectors each being electrically connected in parallel and adapted to convert optical signals into electrical currents, such that corresponding electrical currents from the first and the second single polarization waveguide photodetectors are configured to be combined;
    wherein the integrated receiver chip is configured for direct detection.

2. The integrated receiver chip of claim 1, wherein, when an optical signal is launched into one of the at least one optical input port, the optical signal is split by the polarization manipulation device into a first and a second optical signals, the first and the second optical signals being propagated through the first and the second dispersion compensators, respectively, such that the first and the second optical signals each selectively incur dispersion.

3. The integrated receiver chip of claim 1, wherein the polarization manipulation device is a polarization splitter rotator, an input of the polarization splitter rotator being optically connected to the one of the at least optical input ports, a first and a second outputs of the polarization splitter rotator being optically connected to a first and a second input ports of the first and the second dispersion compensators, respectively.

4. The integrated receiver chip of claim 3, wherein the polarization splitter rotator is adapted to split a propagating optical signal into a first and a second optical signals and rotate a polarization of one of the first and the second optical signals, such that the first and the second optical signals each possesses a same polarization.

5. The integrated receiver chip of claim 1, wherein the polarization manipulation device is a polarization splitter, an input of the polarization splitter being optically connected to the one of the at least optical input ports, a first and a second outputs of the polarization splitter being optically connected to a first and a second input ports of the first and the second dispersion compensators, respectively.

6. The integrated receiver chip of claim 5, wherein the polarization splitter is adapted to split a propagating optical signal into a first and a second optical signals, such that the first and the second optical signals each possesses a different polarization.

7. The integrated receiver chip of claim 1, wherein the first and the second dispersion compensators each comprises:
    a tunable dispersion compensator being adapted to induce a dispersion tunable in a range between 0 and D, where D is a value in picoseconds per nanometer;
    a plurality of cascaded and optically connected Mach-Zehnder Interferometer (MZI) switches, a first MZI switch of the plurality of MZI switches being optically connected to the tunable dispersion compensator; and
    a plurality of fixed dispersion compensators, each fixed dispersion compensator of the plurality of fixed dispersion compensators being adapted to induce a fixed dispersion, and being optically connected to a branch of each MZI switch of the plurality of MZI switches;
    wherein each MZI switch is adapted to be controllable for directing a path of propagation of an optical signal, such that the optical signal can selectively incur dispersion.

8. The integrated receiver chip of claim 7, wherein a value of the selectively incurred dispersion is in a range from 0 to 8×D.

9. The integrated receiver chip of claim 1, wherein the first and the second single polarization waveguide photodetectors are electrically and parallelly connected to a signal pad and a ground pad.

10. An optical to electrical (OE) conversion system comprising an integrated receiver chip, a transimpedance amplifier, and a digital signal processor (DSP), the transimpedance amplifier and the digital signal processor each being in electrical communication with the integrated receiver chip, the integrated receiver chip comprising:
    at least one optical input port disposed at a first end of the integrated receiver chip;
    a polarization splitter disposed after the at least one optical input port;
    a first and a second dispersion compensators each optically connected to one of the at least one optical input port, the first and the second dispersion compensators each being adapted to selectively induce a dispersion on an optical signal propagating through the dispersion compensator; and a first and a second single polarization waveguide photodetectors optically connected to the first and the second dispersion compensators, respectively, the first and second single polarization waveguide photodetectors being electrically connected in parallel;

wherein, when an optical signal is launched into the integrated receiver chip at one of the at least one optical input port, the first and the second dispersion compensators induce a selected dispersion on the optical signal, the optical signal being absorbed by each of the first and the second single polarization waveguide photodetectors to generate corresponding photocurrents, such that the photocurrents from the first and the second single polarization waveguide photodetectors are configured to be combined into a combined photocurrent that is transmitted to the transimpedance amplifier, the transimpedance amplifier being configured to convert the combined photocurrent to a voltage signal; and wherein the DSP is configured to monitor inducing of the dispersion on the optical signal by digitally processing a bit error rate of the voltage signal being outputted from the transimpedance amplifier, the DSP being further configured to transmit a control signal to each of the first and the second dispersion compensators for selectively adjusting a value of the induced dispersion and the integrated receiver chip is configured for direct detection.

11. The OE conversion system of claim 10, wherein the polarization splitter is adapted to split an optical signal being launched into the one of the at least one optical input port into a first and a second optical signals.

12. The OE conversion system of claim 11, wherein an input of the polarization splitter is optically connected to the one of the at least optical input ports, a first and a second outputs of the polarization splitter being optically connected to a first and a second input ports of the first and the second dispersion compensators, respectively, the polarization splitter being adapted to split the optical signal into the first and the second optical signals, such that the first and the second optical signals each possesses a different polarization.

13. The OE conversion system of claim 12, wherein the first and the second dispersion compensators are adapted to induce a polarization mode dispersion on the first and the second optical signals, respectively, such that the polarization dispersions of the first and the second optical signals can be selectively compensated, respectively.

14. The OE conversion system of claim 10, further comprising:
a first signal pad and a first pair of ground pads disposed at a second end of the integrated receiver chip, the first signal pad and the first pair of ground pads being electrically connected to the first and the second single polarization waveguide photodetectors; and
a second signal pad and a second pair of ground pads electrically connected to the transimpedance amplifier;
wherein the first and second single polarization waveguide photodetectors are electrically connected in parallel;
wherein the first signal pad and the first pair of ground pads are electrically connected to the second signal pad and the second pair of ground pads, respectively, such that to enable electrical transmission of the photocurrent of the optical signal between each of the first and the second single polarization waveguide photodetectors and the transimpedance amplifier.

15. The OE conversion system of claim 10, wherein the first and the second dispersion compensators each comprises:
a tunable dispersion compensator being adapted to induce a dispersion tunable in a range between 0 and D, where D is a value in picoseconds per nanometer;
a plurality of cascaded and optically connected Mach-Zehnder Interferometer (MZI) switches, a first MZI switch of the plurality of MZI switches being optically connected to the tunable dispersion compensator; and
a plurality of fixed dispersion compensators, each fixed dispersion compensator of the plurality of fixed dispersion compensators being adapted to induce a fixed dispersion, and being optically connected to a branch of each MZI switch of the plurality of MZI switches;
wherein each MZI switch is adapted to be controllable for directing a path of propagation of an optical signal, such that the optical signal can selectively incur dispersion.

16. A method of enabling dispersion compensation on an integrated receiver chip configured for direct detection, the integrated receiver chip having a first and a second single polarization waveguide photodetectors, the method comprising steps of integrating a first and a second dispersion compensators on the integrated receiver chip, the first and the second dispersion compensators being optically connected to the first and the second single polarization waveguide photodetectors, respectively, the first and second single polarization waveguide photodetectors being electrically connected in parallel, such that photocurrents electrically transmitted from the first and the second single polarization waveguide photodetectors are combined, and providing a digital signal processor (DSP) in electrical communication with the first and the second dispersion compensators, the DSP being programmed to:
set initial dispersion compensator parameters;
enter scan operation mode;
scan through preset dispersion compensator parameters;
set the parameters for the best BER;
end scan operation mode;
enter tracking operation mode;
tune dispersion compensator parameters; and
find optimum BER.

17. The method of claim 16, wherein finding optimum BER is performed by digitally probing a bit error rate (BER) from a voltage signal, the voltage signal being received from the transimpedance amplifier in electrical communication with the first and the second single polarization waveguide photodetectors; and, evaluate the read BER, such that to determine a sufficiency of the tuned dispersion parameters.

18. The method of claim 16, wherein the integrated receiver chip further comprises a polarization splitter rotator, an input of the polarization splitter rotator being optically connected to an optical input port of the integrated receiver chip, a first and a second outputs of the polarization splitter rotator being configured to be optically connected to a first and a second input ports of the first and the second dispersion compensators, respectively.

19. The method of claim 16, wherein the predefined dispersion parameters define an initial value of dispersion to-be-induced on an optical signal being propagated through each of the first and the second dispersion compensators, and the tuned dispersion parameters define a subsequent value of dispersion to-be-induced on the optical signal, such that to adjust the value of the dispersion.

20. The method of claim 16, wherein the evaluating the read BER is performed by: comparing the read BER to a preset BER threshold, wherein if the read BER is equal to or better the preset BER threshold, the read BER is sufficient; and if the read BER is worse the preset BER threshold, the read BER is insufficient.

* * * * *